Jan. 25, 1949.  J. T. MILLER  2,460,185
GLASS SETTING FOR STORE FRONTS
Filed June 22, 1944  2 Sheets-Sheet 1
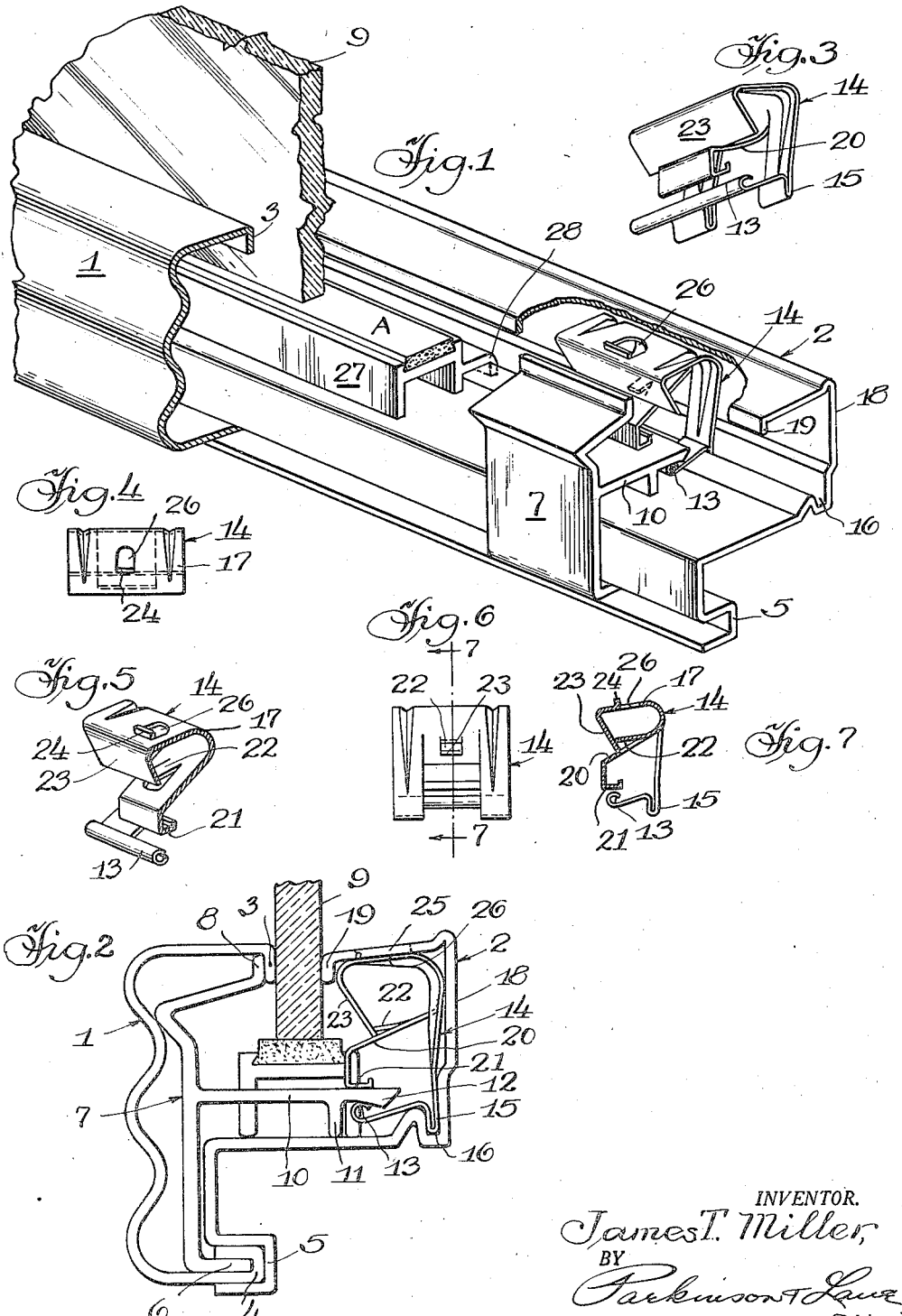
INVENTOR.
James T. Miller,
BY
Parkinson & Lane
Attys.

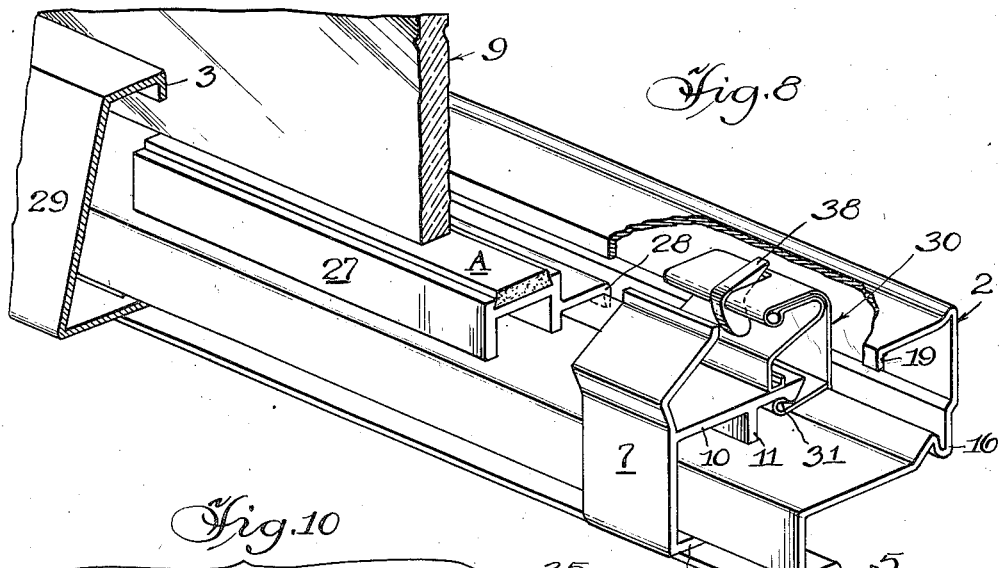
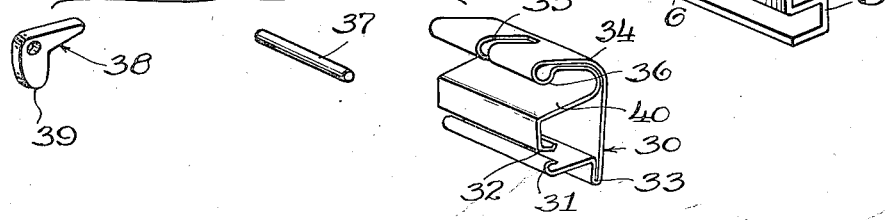
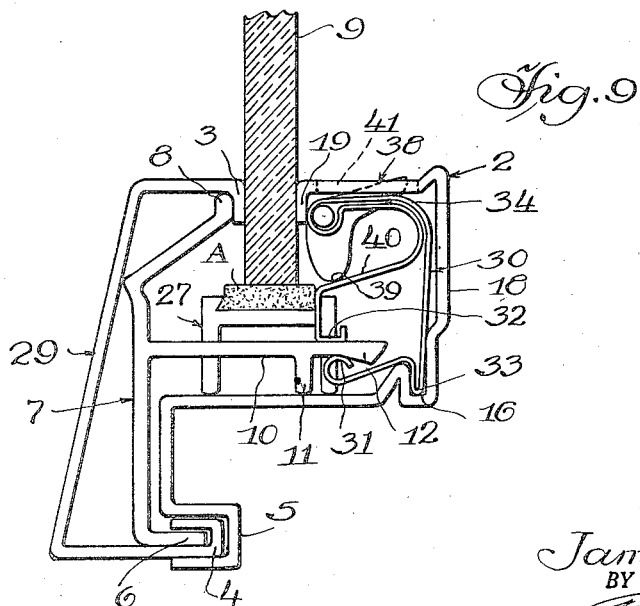

Patented Jan. 25, 1949

2,460,185

UNITED STATES PATENT OFFICE 2,460,185

GLASS SETTING FOR STORE FRONTS

James T. Miller, Niles, Mich., assignor to The Kawneer Company, Niles, Mich., a corporation of Michigan Application June 22, 1944, Serial No. 541,593

6 Claims. (Cl. 20—56.4)

The present invention relates to store fronts and window constructions and especially to a novel glass setting or holding device for firmly but yieldably retaining a pane of glass in its proper mounting.

Among the objects of the present invention is to provide a novel sash construction and mounting for a pane of glass in which the glass is resiliently held between the face moulding or outer sash member and the gutter or inner sash member without the necessity of screws or other securing or adjusting means.

A further object of this invention is to provide a glass setting or holding device with a novel lug and spring clip assembly so constructed and arranged as to resiliently mount and retain a pane of plate glass between a face moulding and gutter member with an amount of pressure sufficient to firmly hold it in assembled relation, but not sufficient to place the glass under strain. As the glass is subjected to vibration and pressures from external sources, the glass setting must be sufficiently resilient or yieldable to eliminate the danger of splitting or cracking of the glass due to such causes.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a fragmentary view in perspective of the novel glass setting or holding assembly.

Figure 2 is a view in end elevation of the novel assembly.

Figure 3 is a view in perspective of the spring clip.

Figure 4 is a top plan view of the spring clip.

Figure 5 is a fragmentary view in perspective of the clip but taken from a different angle than Figure 3.

Figure 6 is a view in rear elevation of the clip.

Figure 7 is a view in vertical cross section taken on the line 7—7 of Figure 6.

Figure 8 is a fragmentary view in perspective of an alternate construction of glass setting device.

Figure 9 is a view in end elevation of the device shown in Figure 8.

Figure 10 is a disassembled view of the alternate construction of spring clip.

Referring more particularly to the novel illustrative embodiment shown in Figures 1 to 7, inclusive, the invention comprehends a novel glass holding or setting assembly comprising a face moulding or outer sash member 1 and a gutter or inner sash member 2 adapted to be mounted upon a sill or other support. The face moulding is provided with a glass engaging flange or lip 3 along its one edge and a return bend 4 along its other edge adapted to be conformably received within a channel 5 provided in the base of the gutter member. The return bend is adapted to receive a leg 6 of a lug 7 having a flange or lip 8 adapted to bear against the flange 3 on the face moulding for forcing the latter into glass engaging and retaining relation with a pane of glass 9. The lug is further provided with a protruding leg or ledge 10 having a supporting rib 11 and having its under surface tapered at its inner end 12, this taper engaging the curled or rounded, resilient end 13 of the spring clip 14.

As shown more clearly in Figure 2, the spring clip is adapted to be received and retained within the gutter 2 by having an edge 15 thereof seating within a longitudinally extending channel 16 provided in the gutter and having its upper curled edge 17 snapped within the gutter between its rear wall 18 and the glass engaging flange or lip 19.

The spring clip 14 is formed with an inwardly projecting and inclined ledge 20 stamped out from the body thereof provided at its lower edge with a shoulder or seating portion 21 adapted to seat and apply pressure against the upper surface of the leg or ledge 10, and an upstanding spring or resilient lip 22 over which is adapted to ride a resilient tongue 23. As this tongue or member 23 is slid or forced forwardly over the spring member 22, it will snap over this member and be held or locked in place in the manner shown in Figure 2, thereby holding the leg or ledge downwardly against the rounded or curled edge 13 and locking the face moulding in assembled relation. In order to release the face moulding, the resilient lip 22 is compressed thereby allowing the resilient tongue 23 to spring back thereover and to rise, and releasing the protruding leg 10 of the lug 7 from between the curled end 13 and the shoulder or seating portion 21.

The lugs 7 and spring clips 14 are suitably spaced apart and located throughout the extent of the setting. In order to retain these spring clips in their assembled relation, a locating lip 24 is provided thereon and this lip extends upwardly into an opening 25 provided in the gutter. Adjacent the lip 24 the clip is provided with an opening 26 aligned with that in the gutter whereby one installing the setting may insert a screw driver or other tool through these aligned openings and thereby force the tongue 23 over the spring lip 22 and into the interlocked position shown in Figure 2. Whenever it is desired to release the lugs and face moulding, a screw driver or tool inserted into these aligned openings 25 and 26 may force the lip 22 downwardly so as to disengage the tongue 23, which due to its resiliency, will spring back so as to release the engagement between the spring clip and its lug and thereby permit removal of the face moulding 1.

Suitably spaced setting blocks 27 for the glass may be provided with each setting block having a rearwardly extending flange provided with a projection or rib 28 adapted to be received within the recess or channel 15 at the rear of the gutter member to locate these setting blocks and prevent lateral shifting thereof. Each setting block carries a cushion A for the glass seated in a dove-tailed slot.

In Figures 8, 9 and 10 is disclosed a glass holding construction in which the face moulding 29 is retained in assembled relation with the gutter member 2 by lugs 7 similar to those shown in Figures 1 to 7, inclusive, but by an alternate construction of spring clips 30. Each spring clip is provided with a rounded or curled resilient end 31 engaging the under surface of the tapered end 12 of the lug 7, and its other end formed to provide a shoulder or seating portion 32 adapted to seat upon and apply pressure against the upper surface of the leg or ledge 10.

The spring clip is retained in its proper spaced relation within the gutter 2 by having an edge 33 thereof seating within the longitudinally extending channel 16 in the base of the gutter, and having its upper edge 34 snapped or anchored within the gutter between its rear wall 18 and the glass engaging flange or lip 19. The upper curled edge 34 is slotted at 35 and formed with a rounded portion 36 to receive and journal a pivot pin 37 for a pivotally arranged trigger 38 having its end 39 formed to provide a cam surface adapted to engage the inclined surface or ledge 40 of the spring clip and thereby force the seating portion or shoulder 32 downwardly and lock the lug and face moulding in assembled relation. As shown in Figure 9, a part of the trigger extends through a slot 41 in the gutter and when it is pushed down, the parts are locked together, and when it is raised, the cam surface of the end 39 is raised or disengaged from the inclined surface 40 and thereby releases the lug 7 to permit removal of the face moulding 29. In order to secure access to this trigger, the gutter 2 is preferably slotted to permit the trigger to project therethrough and be operated from the rear of the store front or window.

From the above description and the disclosure in the drawings, it will be evident that the invention comprehends a novel glass holding or setting device in which plate glass of varying thickness is firmly yet resiliently retained in assembled relation without the necessity of any screws or other securing or attaching means. Also the spring clips are readily and easily snapped into the gutter and thereat retained without the use of any securing means. Furthermore, release of the moulding for removal of the glass or replacement of any of the sash assembly is accomplished from the rear of the window.

Having thus disclosed my invention, I claim:

1. A glass holding device for store fronts, windows and the like for supporting a pane of glass, comprising a face moulding, a gutter section, lugs carried in the face moulding at spaced intervals, spring clips mounted at similarly spaced intervals in the gutter section, and means for detachably connecting the lugs and spring clips in such manner as to grip the pane of glass between the moulding and gutter section but permitting ready removal of the moulding and lugs for disassembly, said means including a tapered surface on one side of the lug, a part on the clip adapted to frictionally engage the tapered surface, another part adapted to engage the lug and resiliently clamp the lug therebetween, and a cam member adapted to lock the clip and lug together to retain the face moulding in assembled relation.

2. A glass holding device for store fronts, windows and the like for supporting a pane of glass, comprising a face moulding, a gutter section, lugs carried in the face moulding at spaced intervals, spring clips mounted at similarly spaced intervals in the gutter section, and means for detachably connecting the lugs and spring clips in such manner as to grip the pane of glass between the moulding and gutter section but permitting ready removal of the moulding and lugs for disassembly, said means including a tapered surface on the underside of a projection on the lug with one end of the clip engaging this tapered surface and the other end of the clip engaging the upper surface of the projection to resiliently couple the lug and clip by clamping the lug between the ends of the clip, and means on the clip for securing said other end of the clip in locked position.

3. In a store front construction, a glass setting device for supporting a pane of glass, comprising an outer and an inner sash member with the outer member providing a face moulding and the inner member a gutter, and means for detachably mounting the moulding in assembled relation without the use of screws or the like, said means including spaced lugs and spring clips carried by the moulding and gutter, respectively, a rearwardly projecting leg on each lug with the underside of the leg tapered, a resilient part on each clip adapted to engage the tapered underside of the leg, a shoulder provided on the clip seating against the upper surface of the leg to clamp the leg therebetween and provided with an inclined surface, and a resilient part on the clip having a camming action against the inclined surface to bear thereagainst and retain the shoulder tightly against the leg to thereby lock the lug and moulding in assembled relation.

4. In a store front construction, a glass setting device for supporting a pane of glass, comprising a pair of sash members including an inner member secured in place and an outer member detachable with respect to the inner member, spaced lugs of extruded construction carried by the outer member and similarly spaced resilient clips carried by the inner member, a rearwardly projecting leg on the lugs and resilient projections on the spring clips for resiliently gripping and clamping therebetween the opposite sides of the leg and retaining it and the associated outer sash member in assembled relation.

5. A glass setting device for supporting a pane of glass, comprising an outer and an inner sash member with the outer member providing a face moulding and the inner member a gutter, and means for detachably mounting the moulding in assembled relation without the use of screws or the like, said means including spaced lugs and spring clips carried by the moulding and gutter, respectively, a rearwardly projecting leg on each lug, resilient projections on each clip adapted to receive and clamp therebetween the opposite sides of the leg, and means for locking the resilient projections in tight gripping relation with the leg and thereby retain the face moulding in assembled relation.

6. A glass setting device for supporting a pane of glass, comprising an outer and an inner sash member with the outer member providing a face moulding and the inner member a gutter, and means for detachably mounting the moulding in assembled relation without the use of screws or the like, said means including spaced lugs and spring clips carried by the moulding and gutter, respectively, a rearwardly projecting leg on each lug, resilient projections on each clip adapted to engage and resiliently clamp therebetween the opposite sides of the leg, and a pivotally arranged trigger on each clip for locking the resilient projections in tight gripping relation with the leg and thereby retain the face moulding in assembled relation.

JAMES T. MILLER.

REFERENCES CITED

The following references are of record in the file of this patent:

UNITED STATES PATENTS

| Number | Name | Date |
| --- | --- | --- |
| 1,978,090 | Katz | Oct. 23, 1934 |
| 2,143,737 | Lowry | Jan. 10, 1939 |

FOREIGN PATENTS

| Number | Country | Date |
| --- | --- | --- |
| 762,449 | France | Jan. 22, 1934 |

Certificate of Correction

Patent No. 2,460,185.

January 25, 1949.

JAMES T. MILLER

It is hereby certified that errors appear in the printed specification of the above numbered patent requiring correction as follows:

Column 3, line 49, after the word "upper" insert *curled*; column 4, line 24, claim 1, after "engage" insert *the other side of*;

and that the said Letters Patent should be read with these corrections therein that the same may conform to the record of the case in the Patent Office.

Signed and sealed this 26th day of July, A. D. 1949.

[SEAL]

THOMAS F. MURPHY,
*Assistant Commissioner of Patents.*